US012753892B2

(12) United States Patent
Zeuner

(10) Patent No.: US 12,753,892 B2
(45) Date of Patent: Oct. 6, 2026

(54) LIGHTING SYSTEM

(71) Applicant: ZKW Group GmbH, Wieselburg (AT)

(72) Inventor: Markus Zeuner, Mank (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 19/066,400

(22) Filed: Feb. 28, 2025

(65) Prior Publication Data

US 2025/0283586 A1 Sep. 11, 2025

(30) Foreign Application Priority Data

Mar. 7, 2024 (EP) .................................... 24162081

(51) Int. Cl.
*F21S 41/29* (2018.01)
*F21S 41/24* (2018.01)

(52) U.S. Cl.
CPC .................................... *F21S 41/24* (2018.01)

(58) Field of Classification Search
CPC .. F21S 45/50; F21S 43/27; F21S 43/14; F21S 43/247; F21S 41/24; F21S 43/237; F21S 43/245
See application file for complete search history.

(56) References Cited

U.S. PATENT DOCUMENTS

2003/0081423 A1 5/2003 Shinji et al.
2015/0241626 A1 8/2015 Goto et al.
2021/0095836 A1 4/2021 Hartwig et al.
2021/0278089 A1 9/2021 Henrici et al.

FOREIGN PATENT DOCUMENTS

DE 102012109422 B4 * 7/2023 ........... G02B 6/0091
FR 3087169 A1 4/2020
JP 2004255929 A 9/2004

OTHER PUBLICATIONS

Search English translation of DE 102012109422 B4 (Year: 2023).*
Extended European Search Report for EP Patent Application No. 24162081.4 dated Jul. 3, 2024.

* cited by examiner

*Primary Examiner* — Omar Rojas Cadima
(74) *Attorney, Agent, or Firm* — Eversheds Sutherland (US) LLP

(57) ABSTRACT

A lighting system (1) including an illuminant (4), a light guiding body (2), which is associated with the illuminant (4), a holding device (3), which is designed to hold the illuminant (4) and the light guiding body (2) relative to one another and seal the end section (2*a*) and the illuminant (4) against environmental influences, wherein the holding device (3) has a holding element (6) with a shape corresponding to the end section (2*a*) of the light guiding body (2), wherein the holding element (6) is designed as a sealing element, which tapers along its longitudinal extent (6L) an the insertion opening (6*a*), whereby the inner surface (6*b*) of the holding element (6) facing a holding section (2*b*) of the light guiding body (2) makes sealing contact with an outer surface (5*b*) of the holding section (2*b*).

19 Claims, 2 Drawing Sheets

LIGHTING SYSTEM

CROSS-REFERENCE TO RELATED APPLICATIONS

This application claims priority to European Patent Application No. 24162081.4, filed Mar. 7, 2024, which is incorporated herein by reference.

TECHNICAL FIELD

The invention relates to a lighting system, comprising:

an illuminant for producing and emitting light along a main emission direction, a light guiding body, which is associated with the illuminant, wherein the light guiding body has an end section with a light entry surface, wherein light from the illuminant can enter the light guiding body via the light entry surface, wherein an outer surface of the light guiding body delimiting the light guiding body extends away from the light entry surface along a longitudinal extension of the light guiding body, wherein the light guiding body, in particular its outer surface, has a light exit section, via which light that has entered exits the light guiding body, a holding device, which is designed to hold the illuminant and the light guiding body relative to one another and seal the end section and the illuminant, preferably against environmental influences, outside influences and/or contamination, wherein the holding device comprises a rear side and a front side facing away from the rear side, wherein a first receiving section is formed on the rear side on which the illuminant is received, wherein a second receiving section is formed on the front side on which the light guiding body is received, wherein the first receiving section and the second receiving section are designed in such a way that light emitted by the illuminant received on the first receiving section is emitted onto the light entry surface of the light guiding body received on the second receiving section, wherein the second receiving section has a holding element with a shape corresponding to the light guiding body, preferably with a shape corresponding to the end section of the light guiding body, wherein the holding element has a longitudinal extent, which extends away from the front side of the holding device and ends in an insertion opening of the holding element, wherein the longitudinal extent of the holding element is shorter than the longitudinal extension of the light guiding body, wherein in order to receive the light guiding body on the second receiving section, the end section can be inserted into the insertion opening of the holding element along an insertion direction oriented in particular along the main emission direction, wherein the holding device comprises a blocking means which blocks insertion of the light guiding element along the insertion direction beyond an end position, wherein, in the inserted state, the holding element encases a section of the light guiding body on the periphery at least in sections, preferably completely, wherein that section of the outer surface of the light guiding body encased by the holding element defines a holding section of the light guiding body on which an inner surface of the holding element is opposite the outer surface of the light guiding body, wherein, in the inserted state, the light exit section is arranged on a side of the insertion opening facing away from the illuminant, in particular outside of the holding element.

The invention further relates to a motor vehicle or a vehicle light for a motor vehicle, comprising a lighting system.

The invention further relates to a vehicle component for a motor vehicle, comprising a lighting system.

TECHNICAL BACKGROUND

Generic lighting systems used in particular in motor vehicles are known in the prior art. In such lighting systems, it is necessary to protect electronic and/or optical components of the lighting system from outside influences, for example from environmental influences, wherein this is usually achieved with sealing elements. In known solutions, a housing in which the electronic and optical components are accommodated is usually sealed at a plurality of locations. The housing is often sealed with separate sealants at a rear side to which the electronic components are attached and at a front side to which the optical components are attached, increasing the design effort and costs.

SUMMARY OF THE INVENTION

The object of the present invention involves mitigating or eliminating the disadvantages of the prior art. The object of the invention is therefore in particular to create a lighting system where the electronic and optical components of the lighting system are reliably sealed using simple means. This object is achieved by a lighting system having the features of Claim 1 and alternatively with a lighting system having the features of Claim 12. Preferred embodiments are specified in the dependent claims.

According to the invention, the holding element is designed as a sealing element, which tapers along the longitudinal extent towards the insertion opening in such a way that the inner surface of the holding element facing the holding section of the light guiding body makes sealing contact with the outer surface of the holding section, wherein the sealing contact prevents particles and/or fluids from penetrating through the insertion opening from the front side of the holding device to the rear side of the holding device, in particular to the illuminant.

This has the advantage that the holding element holds the light guiding body in a predetermined position relative to the illuminant by encasing the holding section and at the same time seals the connecting section between the illuminant and the light guide, or that area where the illuminant is opposite the light guide, against contamination. As such, the lighting system can also be used outside a motor vehicle headlight housing to illuminate motor vehicle components, for example, as the lighting system is not reliant on the sealing elements of the motor vehicle headlight housing.

It may be provided that the end section of the light guiding body is closer to the illuminant than the holding section of the light guiding body.

It may be provided that the first receiving section and the second receiving section have a first material and the holding element has a second material, wherein the second material has a higher degree of elasticity than the first material, wherein the light guiding body has a first diameter and the insertion opening has a second diameter smaller than the first diameter, wherein the difference in diameter and the degree of elasticity of the second material are selected such that the end section of the light guiding body can be inserted into the insertion opening and the insertion opening expands due to the elasticity during insertion, and that after insertion, the inner surface of the holding element forms a sealing contact with the holding section of the light guiding body.

It may be provided that a latching element, for example a latching lug or a latching recess, is formed on the end section of the light guiding body, and a latching counter-element complementary to the latching element is formed on the second receiving section, wherein the latching element and the latching counter-element are designed to form a latching connection, wherein the latching connection engages when the light guiding body reaches the end position within the holding element, whereby movement of the light guiding body out of the holding element, in particular along the main emission direction, is blocked, wherein the light entry surface has a predetermined distance from the illuminant in the end position.

It may be provided that the holding element interacts with the second receiving section in such a way that a movement of the light guiding body in a plane oriented orthogonally to the longitudinal extension of the light guiding body is blocked.

It may be provided that the holding element has a penetration section, wherein the holding device has at least one penetration opening, which extends from the front side to the rear side, wherein the penetration section passes through the penetration opening from the front side to the rear side.

It may be provided that the illuminant has an illuminant carrier, on which at least one light source of the illuminant is arranged, wherein another sealing element is formed on the rear side of the holding device, which is designed to form a sealing contact between the first receiving section and the illuminant carrier.

It may be provided that the holding element, the penetration section and the other sealing element formed on the rear side of the holding device are formed integrally, wherein the blocking means is preferably formed on the illuminant carrier.

It may be provided that the holding element comprises a sleeve, in particular an elastic one, encasing the end section and the holding section of the light guiding body.

It may be provided that the holding device has a first material, for example plastic, in particular a thermoplastic or a thermoset, and the holding element has a second material different from the first material, for example an elastomer, wherein the second material is more elastic than the first material, wherein the holding element passes through the holding device, wherein in particular the holding element and the holding device form a 2-component part.

It may be provided that the light guiding body comprises a preferably transparent light guide, for example an optical fibre or a light guide with a circular cross-section, wherein light preferably propagates within the light guiding body by means of total reflection on an inner side of the outer surface through the light guiding body along its longitudinal extent.

According to an alternative solution according to the invention, the holding device has a sealing sleeve, which has a shape corresponding to the light guiding body and the holding element, wherein the sealing sleeve encases the holding element and the light guiding body protruding therefrom in a form-fitting manner on the periphery, wherein the holding section and the insertion opening are sealed by the encasement.

It may be provided that the sealing sleeve is designed as a substantially cylindrical shrink tube. The shrink tube is preferably thermally treated (in particular heated) after it has been placed over the holding element and the light guiding body, whereby the diameter of the shrink tube is reduced and a close-fitting or sealing contact with the holding element and the light guiding body is formed.

According to another aspect of the invention, a vehicle light for a motor vehicle or a motor vehicle is provided, which comprises a lighting system.

According to another aspect of the invention, a vehicle component is provided for a motor vehicle, comprising a lighting system, wherein the vehicle component comprises, for example, a body element, in particular a radiator grill, or is designed as such, wherein the holding device is designed for attachment to the vehicle component and the illuminant with the light guiding body are designed to illuminate the vehicle component.

The lighting system may be provided for a motor vehicle. The lighting system can also be provided for a motor vehicle component or form a system together with a motor vehicle component. In an installation state in which it is installed in a motor vehicle, the lighting system can be arranged outside of a motor vehicle headlight of the motor vehicle (in particular outside of a housing of the motor vehicle headlight). The lighting system is preferably provided for a motor vehicle and is designed in particular to illuminate a motor vehicle component of the motor vehicle, wherein the lighting system can preferably be operated independently of a motor vehicle headlight of the motor vehicle.

BRIEF DESCRIPTION OF THE DRAWINGS

The invention is outlined in more detail below based on preferred exemplary embodiments, to which it is, however, not limited. In the drawings.

DETAILED DESCRIPTION OF EMBODIMENTS

Figure 1:
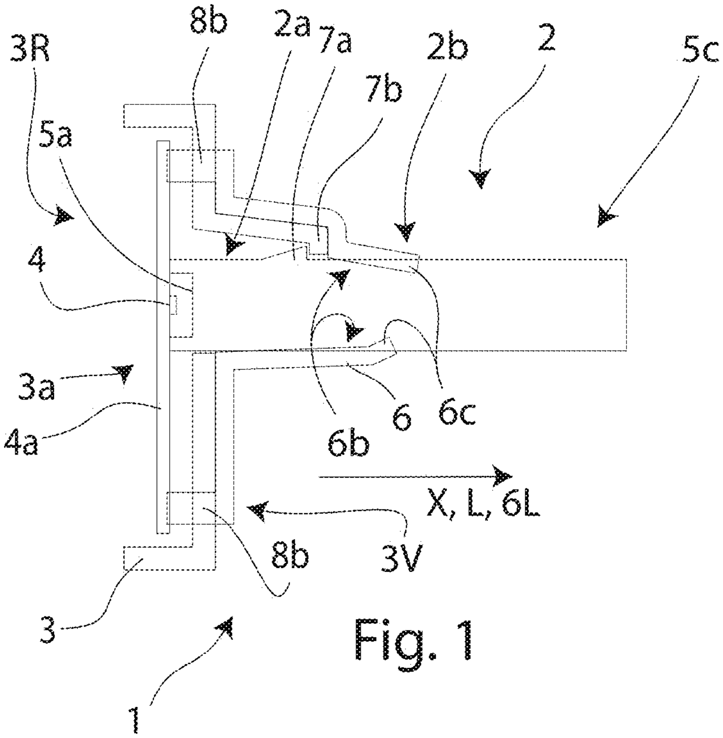
FIG. 1 shows a sectional view of a lighting system according to the invention in accordance with a first exemplary embodiment.

FIG. 1 shows a first exemplary embodiment of a lighting system 1, comprising an illuminant 4, for producing and emitting light along a main emission direction x. The lighting system 1 further comprises a light guiding body 2, which is associated with the illuminant 4. The light guiding body 2 has an end section 2*a* with a light entry surface 5*a*, wherein light from the illuminant 4 can enter the light guiding body 2 via the light entry surface 5*a*. An outer surface 5*b* of the light guiding body 2 delimiting the light guiding body 2 extends away from the light entry surface 5*a* along a longitudinal extension L of the light guiding body 2. In the exemplary embodiment shown, the longitudinal extension L is oriented parallel to the main emission direction x. The light guiding body 2, in particular its outer surface 5*b*, has a light exit section 5*c*, via which light that has entered exits the light guiding body 2. The light exit section 5*c* is arranged on a section of the light guide facing away from the illuminant 4.

The lighting system 1 further comprises a holding device 3, which is designed to hold the illuminant 4 and the light guiding body 2 relative to one another and seal the end section 2*a* and the illuminant 4, preferably against environmental influences, outside influences and/or contamination.

Figure 2:
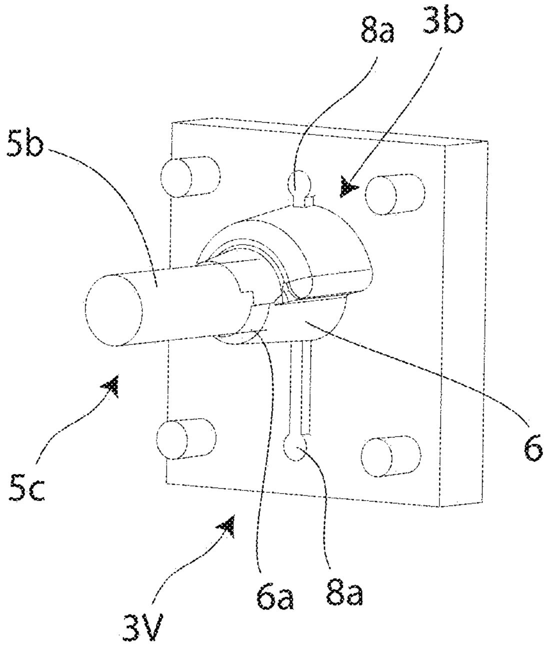
FIG. 2 shows a perspective front view of the lighting system according to FIG. 1.
Figure 3:
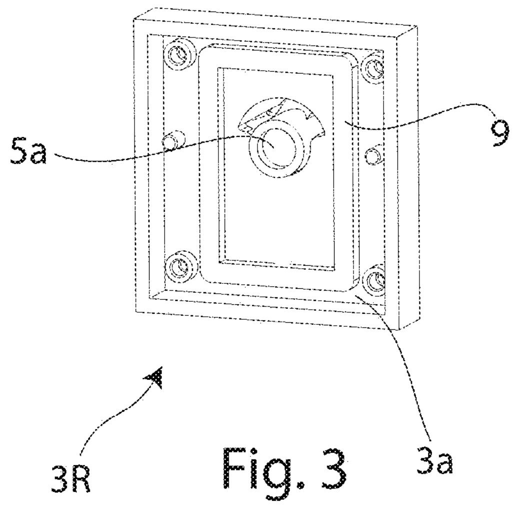
FIG. 3 shows a perspective rear view of the lighting system according to FIG. 1.

The holding device 3 has a rear side 3R (cf. FIG. 3) and a front side 3V facing away from the rear side 3R (cf. FIG. 2).

A first receiving section 3*a* is formed on the rear side 3R on which the illuminant 4 is received. A second receiving section 3*b* is formed on the front side 3V on which the light guiding body 2 is received. The first receiving section 3*a* and the second receiving section 3*b* are designed in such a way that light emitted by the illuminant 4 received on the first receiving section 3*a* is emitted onto the light entry surface 5*a* of the light guiding body 2 received on the second receiving section 3*b*. The illuminant 4 has an illuminant carrier 4*a* on which at least one light source of the illuminant 4 is arranged. Another sealing element 9 is formed on the rear side 3R of the holding device 3, which is designed to form a sealing contact between the first receiving section 3*a* and the illuminant carrier 4*a*.

A holding element 6 is received on the second receiving section 3*b* and has a shape corresponding to the end section 2*a* of the light guiding body 2. The holding element 6 has a longitudinal extent 6L, which extends away from the front side 3V of the holding device 3 and ends or opens into an insertion opening 6*a* of the holding element 6 The longitudinal extent 6L of the holding element 6 is shorter than the longitudinal extension L of the light guiding body 2.

In order to receive the light guiding body 2 on the second receiving section 3*b*, the end section 2*a* can be inserted into the insertion opening 6*a* of the holding element 6 along an insertion direction oriented in particular along the main emission direction x. The holding device 3 comprises a blocking means which blocks insertion of the light guiding element 2 along the insertion direction beyond an end position. In the inserted state, the holding element 6 encases a section of the light guiding body 2 on the periphery at least in sections, preferably completely. That section of the outer surface 5*b* of the light guiding body 2 encased by the holding element 6 defines a holding section 2*b* of the light guiding body 2. On this, an inner surface 6*b* of the holding element 6 is opposite the outer surface 5*b* of the light guiding body 2. In the inserted state, the light exit section 5*c* is arranged on a side of the insertion opening 6*a* facing away from the illuminant 4, in particular outside of the holding element 6. In particular, a section of the light guiding body 2 protrudes from the holding element 6, wherein the protruding section has the light exit section 5*c*. The protruding section preferably comprises at least 75%, or more than 85%, or more than 90% of the overall length of the light guiding body. Furthermore, the end section 2*a* of the light guiding body 2 is closer to the illuminant 4 than the holding section 2*b*.

According to the first exemplary embodiment, the holding element 6 is designed as a scaling element, which tapers along the longitudinal extent 6L towards the insertion opening 6*a* in such a way that the inner surface 6*b* of the holding element 6 facing the holding section 2*b* of the light guiding body 2 makes sealing contact with the outer surface 5*b* of the holding section 2*b*. The sealing contact prevents particles and/or fluids from penetrating through the insertion opening 6*a* from the front side 3V of the holding device 3 to the rear side 3R of the holding device 3, in particular to the illuminant 4. The holding element 6 interacts with the second receiving section 3*b* in such a way that a movement of the light guiding body 2 in a plane oriented orthogonally to the longitudinal extension L of the light guiding body 2 is blocked. The holding element 6 comprises a sleeve, in particular an elastic one, encasing the end section 2*a* and the holding section 2*b* of the light guiding body 2.

The first receiving section 3*a* and the second receiving section 3*b* comprise a first material and the holding element 6 comprises a second material. The second material has a higher degree of elasticity than the first material. The light guiding body 2 has a first diameter and the insertion opening 6*a* has a second diameter smaller than the first diameter. The difference in diameter and the degree of elasticity of the second material are selected such that the end section 2*a* of the light guiding body 2 can (just) be inserted into the insertion opening 6*a* and the insertion opening 6*a* expands due to the elasticity during insertion. After insertion, in particular after the end position has been reached, the inner surface 6*b* of the holding element 6 forms a sealing contact with the holding section 2*b* of the light guiding body 2 due to its elasticity.

A latching element 7*a*, for example a latching lug or a latching recess, can be formed on the end section 2*a* of the light guiding body 2, and a latching counter-element 7*b* complementary to the latching element 7*a* can be formed on the second receiving section 3*b*. The latching element 7*a* and the latching counter-element 7*b* are designed to form a latching connection, which engages when the light guiding body 2 reaches the end position within the holding element 6, whereby movement of the light guiding body 2 out of the holding element 6, in particular along the main emission direction x, is blocked. The light entry surface 5*a* has a predetermined distance from the illuminant 4 in the end position.

In the first exemplary embodiment shown, the holding element 6 has a penetration section 8*a* and the holding device 3 has a corresponding penetration opening 8*b*. This extends from the front side 3V to the rear side 3R. The penetration section 8*a* passes through the penetration opening 8*b* from the front side 3V to the rear side 3R, whereby the holding element 6 is received in the holding device 3. In particular, an exterior surface of the holding element 6 makes form-fitting contact with a surface of the holding device lying opposite it.

The holding element 6 and the holding device 3 can preferably be produced in a 2-component injection moulding process, in which the holding device 3 (consisting of a harder material) is moulded around the holding element 6 (consisting of a softer material). A person skilled in the art is familiar with such methods, which is why details will not be discussed in more depth in this document. The holding element 6, the penetration section 8*a* and the other sealing element 9 formed on the rear side 3R of the holding device 3 are preferably formed integrally. The blocking means can be formed on the illuminant carrier 4*a*.

The holding device 3 comprises a first material, for example plastic, in particular a thermoplastic or a thermoset, and the holding element 6 comprises a second material different from the first material, for example an elastomer. The second material is more elastic than the first material. The holding element 6 passes through the holding device 3, wherein in particular the holding element 6 and the holding device 3 form a 2-component part.

The light guiding body 2 may comprise a preferably transparent light guide, for example an optical fibre or a light guide with a circular cross-section. Light can propagate within the light guiding body 2 by means of total reflection on an inner side of the outer surface 5*b* through the light guiding body 2 along its longitudinal extent L.

Figure 4:
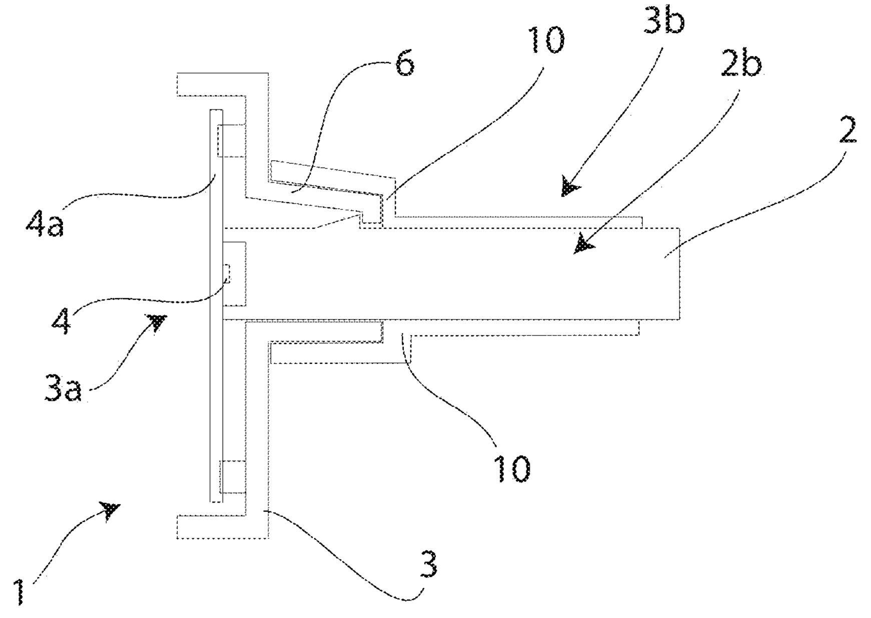
FIG. 4 shows a sectional view of a lighting system according to the invention in accordance with a second exemplary embodiment.

FIG. 4 shows a second exemplary embodiment of a lighting system 1, wherein in this alternative solution the holding device 3 has a sealing sleeve 10, which has a shape corresponding to the light guiding body 2 and the holding element 6. The sealing sleeve 10 encases the holding element 6 and the light guiding body 2 protruding therefrom (or that section of the protruding light guiding body 2 which is close to the outside of the insertion opening 6*a*) in a form-fitting manner on the periphery.

The holding section 2*b* and the insertion opening 6*a* are sealed by the encasement. In this exemplary embodiment, the holding device 3 and the holding element 6 are preferably integrally formed. Furthermore, the holding device 3 and the holding element 6 are made of the same hardness or the same material. Conversely, the sealing sleeve 10 is elastic and in particular thermally deformable. In particular, the sealing sleeve 10 is designed as a substantially cylindrical shrink tube.

In the context of this description, the terms "above", "below", "horizontal", "vertical" should be understood as indications of orientation when the lighting system is arranged in its normal position of use after having been fitted to a motor vehicle.

REFERENCE LIST

1 lighting system
2 light guiding body
2*a* end section
2*b* holding section
3 holding device
3*a* first receiving section
3*b* second receiving section
3R rear side
3V front side
4 illuminant
4*a* illuminant carrier
5*a* light entry surface
5*b* outer surface
5*c* light exit section
6 holding element
6*a* insertion opening
6*b* inner surface
6L longitudinal extent of the holding element
7*a* latching element
7*b* latching counter-element
8*a* penetration section
8*b* penetration opening
9 other sealing element
10 sealing sleeve
L longitudinal extension of the light guiding body
X main emission direction That which is claimed is:

1. A lighting system (1) comprising:

an illuminant (4) configured to produce and emit light along a main emission direction (x);

a light guiding body (2), which is associated with the illuminant (4), wherein the light guiding body (2) has an end section (2*a*) with a light entry surface (5*a*), wherein light from the illuminant (4) can enter the light guiding body (2) via the light entry surface (5*a*), wherein an outer surface (5*b*) of the light guiding body (2) delimiting the light guiding body (2) extends away from the light entry surface (5*a*) along a longitudinal extension (L) of the light guiding body (2), wherein the light guiding body (2), has a light exit section (5*c*), via which light that has entered exits the light guiding body (2); and a holding device (3), which is designed to hold the illuminant (4) and the light guiding body (2) relative to one another and seal the end section (2*a*) and the illuminant (4), wherein the holding device (3) comprises a rear side (3R) and a front side (3V) facing away from the rear side (3R), wherein a first receiving section (3*a*) is formed on the rear side (3R) on which the illuminant (4) is received, wherein a second receiving section (3*b*) is formed on the front side (3V) on which the light guiding body (2) is received, wherein the first receiving section (3*a*) and the second receiving section (3*b*) are designed in such a way that light emitted by the illuminant (4) received on the first receiving section (3*a*) is emitted onto the light entry surface (5*a*) of the light guiding body (2) received on the second receiving section (3*b*);

wherein the second receiving section (3*b*) has a holding element (6) with a shape corresponding to the light guiding body (2), wherein the holding element (6) has a longitudinal extent (6L), which extends away from the front side (3V) of the holding device (3) and ends in an insertion opening (6*a*) of the holding element (6), wherein the longitudinal extent (6L) of the holding element (6) is shorter than the longitudinal extension (L) of the light guiding body (2), wherein in order to receive the light guiding body (2) on the second receiving section (3*b*), the end section (2*a*) is configured to be inserted into the insertion opening (6*a*) of the holding element (6) along an insertion direction oriented along the main emission direction (x), wherein the holding device (3) comprises a blocking means which blocks insertion of the light guiding element (2) along the insertion direction beyond an end position, wherein, in an inserted state, the holding element (6) encases a section of the light guiding body (2) on the periphery at least in sections, wherein a section of the outer surface (5*b*) of the light guiding body (2) encased by the holding element (6) defines a holding section (2*b*) of the light guiding body (2) on which an inner surface (6*b*) of the holding element (6) is opposite the outer surface (5*b*) of the light guiding body (2), wherein, in the inserted state, the light exit section (5*c*) is arranged on a side of the insertion opening (6*a*) facing away from the illuminant (4), and wherein the holding element (6) is a single structural body that also serves as a sealing element, which tapers along the longitudinal extent (6L) towards the insertion opening (6*a*) in such a way that the inner surface (6*b*) of the holding element (6) facing the holding section (2*b*) of the light guiding body (2) makes sealing contact with the outer surface (5*b*) of the holding section (2*b*), wherein the sealing contact prevents particles and/or fluids from penetrating through the insertion opening (6*a*) from the front side (3V) of the holding device (3) to the rear side (3R) of the holding device (3).

2. The lighting system according to claim 1, wherein the end section (2*a*) of the light guiding body (2) is closer to the illuminant (4) than the holding section (2*b*) of the light guiding body (2).

3. The lighting system according to claim 1, wherein the first receiving section (3*a*) and the second receiving section (3*b*) have a first material and the holding element (6) has a second material, wherein the second material has a higher degree of elasticity than the first material, wherein the light guiding body (2) has a first diameter and the insertion opening (6*a*) has a second diameter less than the first diameter, wherein the difference in diameter and the degree of elasticity of the second material are selected such that the end section (2*a*) of the light guiding body (2) can be inserted into the insertion opening (6*a*) and the insertion opening (6*a*) expands due to the elasticity during insertion, and that after insertion, the inner surface (6*b*) of the holding element (6) forms a sealing contact with the holding section (2*b*) of the light guiding body (2).

4. The lighting system according to claim 1, wherein a latching element (7*a*) is formed on the end section (2*a*) of the light guiding body (2), and a latching counter-element (7*b*) complementary to the latching element (7*a*) is formed on the second receiving section (3*b*), wherein the latching element (7*a*) and the latching counter-element (7*b*) are designed to form a latching connection, wherein the latching connection engages when the light guiding body (2) reaches the end position within the holding element (6), whereby movement of the light guiding body (2) out of the holding element (6), along the main emission direction (x), is blocked, wherein the light entry surface (5*a*) has a predetermined distance from the illuminant (4) in the end position.

5. The lighting system according to claim 4, wherein the latching element (7*a*) comprises a latching lug or a latching recess.

6. The lighting system according to claim 1, wherein the holding element (6) interacts with the second receiving section (3*b*) in such a way that a movement of the light guiding body (2) in a plane oriented orthogonally to the longitudinal extension (L) of the light guiding body (2) is blocked.

7. The lighting system according to claim 1, wherein the holding element (6) has a penetration section (8*a*), wherein the holding device (3) has at least one penetration opening (8*b*), which extends from the front side (3V) to the rear side (3R), wherein the penetration section (8*a*) passes through the penetration opening (8*b*) from the front side (3V) to the rear side (3R).

8. The lighting system according to claim 7, wherein the holding element (6), the penetration section (8*a*) and the other sealing element (9) formed on the rear side (3R) of the holding device (3) are formed integrally, or wherein the blocking means is formed on the illuminant carrier (4*a*).

9. The lighting system according to claim 1, wherein the illuminant (4) has an illuminant carrier (4*a*), on which at least one light source of the illuminant (4) is arranged, wherein another sealing element (9) is formed on the rear side (3R) of the holding device (3), which is designed to form a sealing contact between the first receiving section (3*a*) and the illuminant carrier (4*a*).

10. The lighting system according to claim 1, wherein the holding element (6) comprises an elastic sleeve encasing the end section (2*a*) and the holding section (2*b*) of the light guiding body (2).

11. The lighting system according to claim 1, wherein the holding device (3) has a first material, and the holding element (6) has a second material different from the first material, wherein the second material is more elastic than the first material, wherein the holding element (6) passes through the holding device (3), wherein the holding element (6) and the holding device (3) form a 2-component part.

12. The lighting system according to claim 11, wherein the first material comprises a thermoplastic or thermoset polymer, and wherein the second material comprises an elastomer.

13. The lighting system according to claim 1, wherein the light guiding body (2) comprises a light guide or a transparent light guide, wherein at least some of the light propagates within the light guiding body (2) by means of total reflection on an inner side of the outer surface (5*b*) through the light guiding body (2) along its longitudinal extent (L).

14. A motor vehicle or vehicle light for a motor vehicle, comprising the lighting system (1) according to claim 1.

15. A vehicle component for a motor vehicle, the vehicle component comprising:

a lighting system (1) according to claim 1; and a vehicle body element, wherein the holding device (3) of the lighting system is designed for attachment to the vehicle body element and the illuminant (4) with the light guiding body (2) are designed to illuminate the vehicle body element.

16. The lighting system according to claim 1, wherein:

the shape corresponds to the end section (2*a*) of the light guiding body (2);

the holding element (6) completely encases the end section of the light guiding body (2) on the periphery in the inserted state; or the light exit section (5*c*) is arranged outside of the holding element (6) on the side of the insertion opening (6*a*) facing away from the illuminant (4) in the inserted state.

17. A lighting system (1) comprising:

an illuminant (4) for producing and emitting light along a main emission direction (x);

a light guiding body (2), which is associated with the illuminant (4), wherein the light guiding body (2) has an end section (2*a*) with a light entry surface (5*a*), wherein light from the illuminant (4) can enter the light guiding body (2) via the light entry surface (5*a*), wherein an outer surface (5*b*) of the light guiding body (2) delimiting the light guiding body (2) extends away from the light entry surface (5*a*) along a longitudinal extension (L) of the light guiding body (2), wherein an outer surface (5*b*) of the light guiding body (2) has a light exit section (5*c*), via which light that has entered exits the light guiding body (2); and a holding device (3), which is designed to hold the illuminant (4) and the light guiding body (2) relative to one another and seal the end section (2*a*) and the illuminant (4), wherein the holding device (3) comprises a rear side (3R) and a front side (3V) facing away from the rear side (3R), wherein a first receiving section (3*a*) is formed on the rear side (3R) on which the illuminant (4) is received, wherein a second receiving section (3*b*) is formed on the front side (3V) on which the light guiding body (2) is received, wherein the first receiving section (3*a*) and the second receiving section (3*b*) are designed in such a way that light emitted by the illuminant (4) received on the first receiving section (3*a*) is emitted onto the light entry surface (5*a*) of the light guiding body (2) received on the second receiving section (3*b*), wherein the second receiving section (3*b*) has a holding element (6) with a shape corresponding to the end section (2*a*) of the light guiding body (2), wherein the holding element (6) has a longitudinal extent (6L), which extends away from the front side (3V) of the holding device (3) and ends in an insertion opening (6*a*) of the holding element (6), wherein the longitudinal extent (6L) of the holding element (6) is shorter than the longitudinal extension (L) of the light guiding body (2), wherein in order to receive the light guiding body (2) on the second receiving section (3*b*), the end section (2*a*) is configured to be inserted into the insertion opening (6*a*) of the holding element (6) along an insertion direction oriented along the main emission direction (x), wherein the holding device (3) comprises a blocking means which blocks insertion of the light guiding element (2) along the insertion direction beyond an end position, wherein, in an inserted state, the holding element (6) encases a section of the light guiding body (2) on the periphery at least in sections, wherein a section of the outer surface (5*b*) of the light guiding body (2) encased by the holding element (6) defines a holding section (2*b*) of the light guiding body (2) on which an inner surface (6*b*) of the holding element (6) is opposite the outer surface (5*b*) of the light guiding body (2), wherein, in the inserted state, the light exit section (5*c*) is arranged on a side of the insertion opening (6*a*) facing away from the illuminant (4), wherein the holding device (3) has a sealing sleeve (10), which has a shape corresponding to the light guiding body (2) and the holding element (6), wherein the sealing sleeve (10) encases the holding element (6) and the light guiding body (2) protruding therefrom in a form-fitting manner on the periphery, wherein the holding section (2*b*) and the insertion opening (6*a*) are sealed by the encasement, and wherein the sealing sleeve (10) is designed as a substantially cylindrical shrink tube.

18. A motor vehicle or vehicle light for a motor vehicle, comprising the lighting system (1) according to claim 17.

19. A vehicle component for a motor vehicle, the vehicle component comprising:

a lighting system (1) according to claim 17; and a vehicle body element, wherein the holding device (3) of the lighting system is designed for attachment to the vehicle body element and the illuminant (4) with the light guiding body (2) are designed to illuminate the vehicle body element.

* * * * *